US012184004B2

(12) United States Patent
Huang et al.

(10) Patent No.: US 12,184,004 B2
(45) Date of Patent: Dec. 31, 2024

(54) PLUG CONNECTOR, RECEPTACLE CONNECTOR AND CONNECTOR ASSEMBLY WITH POWER SUPPLY FUNCTION

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN); Hongji Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 358 days.

(21) Appl. No.: 17/837,404

(22) Filed: Jun. 10, 2022

(65) Prior Publication Data

US 2022/0416457 A1 Dec. 29, 2022

(30) Foreign Application Priority Data

Jun. 28, 2021 (CN) ......................... 202110717757.2

(51) Int. Cl.
*H01R 12/00* (2006.01)
*H01R 12/72* (2011.01)
*H01R 13/428* (2006.01)

(52) U.S. Cl.
CPC ......... *H01R 12/721* (2013.01); *H01R 13/428* (2013.01)

(58) Field of Classification Search
CPC ............................ H01R 12/721; H01R 13/428
USPC ............................................................ 439/79
See application file for complete search history.

(56) References Cited

U.S. PATENT DOCUMENTS 4,756,695 A * 7/1988 Lane ...................... H01R 24/62 439/535
5,073,130 A * 12/1991 Nakamura ......... H01R 13/6582 439/607.32
6,394,844 B1 * 5/2002 Frias Valero ........ H01R 13/516 439/701

(Continued)

FOREIGN PATENT DOCUMENTS

TW M588373 U 12/2019

*Primary Examiner* — Abdullah A Riyami
*Assistant Examiner* — Vladimir Imas
(74) *Attorney, Agent, or Firm* — Birch, Stewart, Kolasch & Birch, LLP

(57) ABSTRACT

A plug connector includes a tongue plate, a metal shell and a plug power terminal. At least one side of the tongue plate is provided with a number of conductive pads arranged at intervals along a transverse direction. The metal shell includes a receiving space for receiving the tongue plate. The plug power terminal is located on at least one side of the conductive pads in the transverse direction. The present disclosure also discloses a receptacle connector matched with the plug connector. The receptacle connector includes a receptacle power terminal. The present disclosure also discloses a connector assembly having the plug connector and the receptacle connector. Compared with the prior art, the present disclosure enables the plug connector, the receptacle connector and the connector assembly to have a power supply function by providing the plug power terminal and the receptacle power terminal.

19 Claims, 15 Drawing Sheets

(56) References Cited

U.S. PATENT DOCUMENTS

| | | | | | |
|---|---|---|---|---|---|
| 7,025,632 | B2 * | 4/2006 | Hu | H01R 13/405 | 439/607.01 |
| 7,134,884 | B2 * | 11/2006 | Wang | H01R 13/6658 | 439/951 |
| 7,422,488 | B1 * | 9/2008 | Wu | H01R 24/62 | 439/676 |
| 7,442,057 | B2 * | 10/2008 | Ko | H01R 12/716 | 439/101 |
| 7,540,784 | B1 * | 6/2009 | Zhang | H01R 12/721 | 439/566 |
| 7,628,655 | B1 * | 12/2009 | Chen | H01R 12/721 | 439/60 |
| 7,670,191 | B2 * | 3/2010 | Ortega | H01R 24/62 | 439/660 |
| 7,909,619 | B2 * | 3/2011 | Pepe | H01R 13/743 | 439/541.5 |
| 7,931,485 | B2 * | 4/2011 | Tseng | H01R 13/748 | 439/284 |
| 7,946,893 | B2 * | 5/2011 | Chen | H01R 24/60 | 439/660 |
| 8,007,327 | B2 * | 8/2011 | Yang | H01R 13/2464 | 439/862 |
| 8,303,329 | B2 * | 11/2012 | Wu | H01R 24/62 | 439/607.01 |
| 8,702,452 | B2 * | 4/2014 | Tai | H01R 13/6461 | 439/108 |
| 8,882,515 | B2 * | 11/2014 | Lv | H01R 27/02 | 439/79 |
| 9,496,664 | B2 * | 11/2016 | Little | H01R 24/60 | |
| 9,525,227 | B2 * | 12/2016 | Little | H01R 13/6273 | |
| 9,590,353 | B2 * | 3/2017 | Regnier | H01R 13/6582 | |
| 9,685,735 | B1 * | 6/2017 | Chen | H01R 12/73 | |
| 9,768,567 | B2 * | 9/2017 | Cheng | H01R 13/6585 | |
| 9,997,853 | B2 * | 6/2018 | Little | H01R 13/6471 | |
| 10,367,308 | B2 * | 7/2019 | Little | H01R 4/2404 | |
| 10,396,480 | B2 | 8/2019 | Lee et al. | | |
| 11,088,480 | B2 * | 8/2021 | Avery | H01R 13/405 | |
| 11,309,655 | B2 * | 4/2022 | Avery | H01R 13/514 | |
| 2009/0290321 | A1 * | 11/2009 | Chen | H01R 12/721 | 361/823 |
| 2010/0221955 | A1 * | 9/2010 | Pepe | H01R 13/514 | 439/676 |
| 2021/0313717 | A1 | 10/2021 | Hung | | |

* cited by examiner

PLUG CONNECTOR, RECEPTACLE CONNECTOR AND CONNECTOR ASSEMBLY WITH POWER SUPPLY FUNCTION

CROSS-REFERENCE TO RELATED APPLICATION

This patent application claims priority of a Chinese Patent Application No. 202110717757.2, filed on Jun. 28, 2021 and titled "PLUG CONNECTOR, RECEPTACLE CONNECTOR AND CONNECTOR ASSEMBLY", the entire content of which is incorporated herein by reference.

TECHNICAL FIELD

The present disclosure relates to a plug connector, a receptacle connector and a connector assembly, which belongs to a technical field of connectors.

BACKGROUND

An existing connector assembly usually includes a plug connector and a receptacle connector which are mated with each other. For data transmission, the plug connector and the receptacle connector are respectively provided with a plurality of conductive terminals. However, with the continuous improvement of equipment requirements, the plug connector and the receptacle connector are not only required to have a data transmission function, but also other functions (such as a power supply function), which brings challenges to the design of the plug connector and the receptacle connector.

SUMMARY

An object of the present disclosure is to provide a plug connector, a receptacle connector and a connector assembly with power supply function.

In order to achieve the above object, the present disclosure adopts the following technical solution: a plug connector, including: a tongue plate, the tongue plate extending along a longitudinal direction, at least one side of the tongue plate being provided with a plurality of conductive pads, the conductive pads located on a same side of the tongue plate being arranged at intervals along a transverse direction perpendicular to the longitudinal direction; and a metal shell, the metal shell being located on a periphery of the tongue plate, the metal shell including a first wall portion, a second wall portion opposite to the first wall portion, a first side wall connecting one side of the first wall portion and one side of the second wall portion, and a second side wall connecting another side of the first wall portion and another side of the second wall portion, the first wall portion, the second wall portion, the first side wall and the second side wall being jointly enclosed to form a receiving space to receive the tongue plate, the first wall portion defining an opening extending through the first wall portion in a direction away from the second wall portion, the opening being in communication with the receiving space, the conductive pads provided on the at least one side of the tongue plate being exposed in the opening; wherein the plug connector further includes at least one plug power terminal located on at least one side of the conductive pads in the transverse direction, the plug power terminal includes an elastic mating portion protruding toward the tongue plate in the transverse direction, and the elastic mating portion protrudes into the receiving space.

In order to achieve the above object, the present disclosure adopts the following technical solution: a receptacle connector, including: an insulating body, the insulating body including a base and a mating protrusion extending from the base, the mating protrusion including a mating surface and a mating slot extending through the mating surface; and a plurality of conductive terminals, the plurality of conductive terminals including a first row of conductive terminals and a second row of conductive terminals, the first row of each conductive terminal including a first elastic contact portion extending into the mating slot, the second row of each conductive terminal including a second elastic contact portion extending into the mating slot, the first elastic contact portions and the second elastic contact portions being located on opposite sides of the mating slot, respectively; wherein the receptacle connector further includes at least one receptacle power terminal, the receptacle power terminal includes a plate-shaped contact portion located on at least one side of the mating slot in a width direction of the mating protrusion, and the plate-shaped contact portion is located outside the mating protrusion.

In order to achieve the above object, the present disclosure adopts the following technical solution: a connector assembly, including: a plug connector, including: a tongue plate, the tongue plate extending along a longitudinal direction, at least one side of the tongue plate being provided with a plurality of conductive pads, the conductive pads located on a same side of the tongue plate being arranged at intervals along a transverse direction perpendicular to the longitudinal direction; and a metal shell, the metal shell being located on a periphery of the tongue plate, the metal shell including a first wall portion, a second wall portion opposite to the first wall portion, a first side wall connecting one side of the first wall portion and one side of the second wall portion, and a second side wall connecting another side of the first wall portion and another side of the second wall portion, the first wall portion, the second wall portion, the first side wall and the second side wall being jointly enclosed to form a receiving space to receive the tongue plate, the first wall portion defining an opening extending through the first wall portion in a direction away from the second wall portion, the opening being in communication with the receiving space, the conductive pads provided on the at least one side of the tongue plate being exposed in the opening; wherein the plug connector further includes at least one plug power terminal located on at least one side of the conductive pads in the transverse direction, the plug power terminal includes an elastic mating portion protruding toward the tongue plate in the transverse direction, and the elastic mating portion protrudes into the receiving space; and a receptacle connector, including: an insulating body, the insulating body including a base and a mating protrusion extending from the base, the mating protrusion including a mating surface and a mating slot extending through the mating surface; and a plurality of conductive terminals, the plurality of conductive terminals including a first row of conductive terminals and a second row of conductive terminals, the first row of each conductive terminal including a first elastic contact portion extending into the mating slot, the second row of each conductive terminal including a second elastic contact portion extending into the mating slot, the first elastic contact portions and the second elastic contact portions being located on opposite sides of the mating slot, respectively; wherein the receptacle connector further includes at least one receptacle power terminal, the receptacle power terminal includes a plate-shaped contact portion located on at least one side of the mating slot in a width direction of the mating protrusion, and the plate-shaped contact portion is located outside the mating protrusion; wherein the tongue plate is at least partially inserted into the mating slot, so that the plurality of conductive pads are in contact with the first elastic contact portions and the second elastic contact portions, and the elastic mating portion of the plug power terminal is in contact with the plate-shaped contact portion of the receptacle power terminal.

Compared with the prior art, the present disclosure enables the plug connector, the receptacle connector and the connector assembly to have a power supply function by adopting a plug power terminal located on at least one lateral side of the conductive pads and a receptacle power terminal located on at least one lateral side of the mating slot.

DETAILED DESCRIPTION

Figure 1:
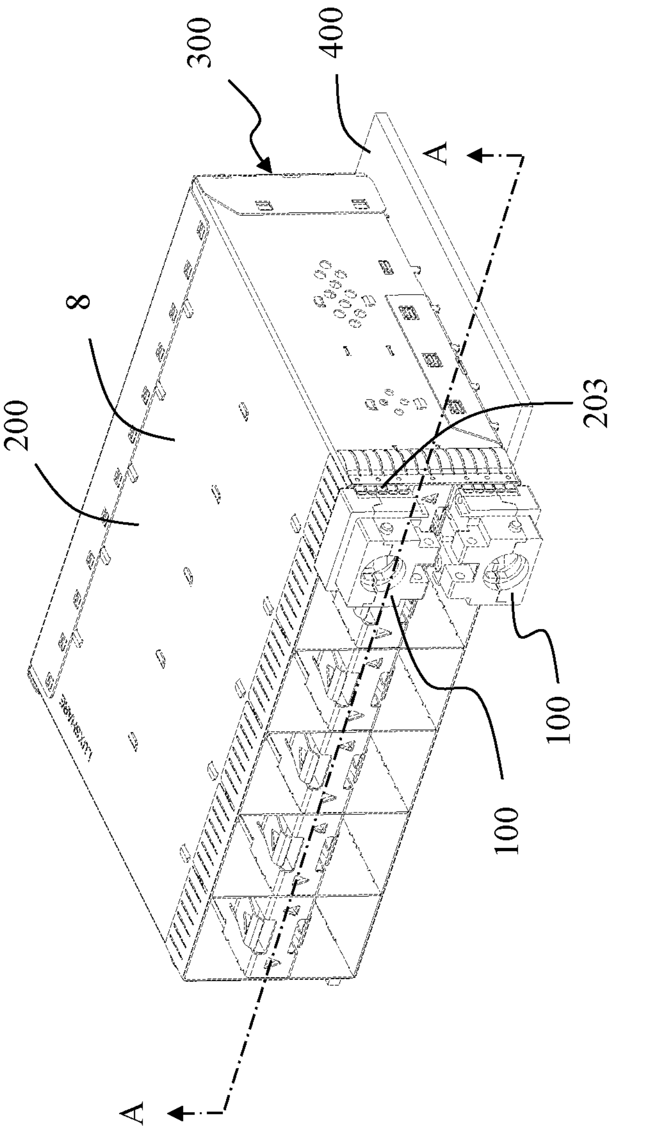
FIG. 1 is a perspective schematic view of a connector assembly in accordance with an embodiment of the present disclosure, in which a plug connector is inserted into a receptacle connector.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
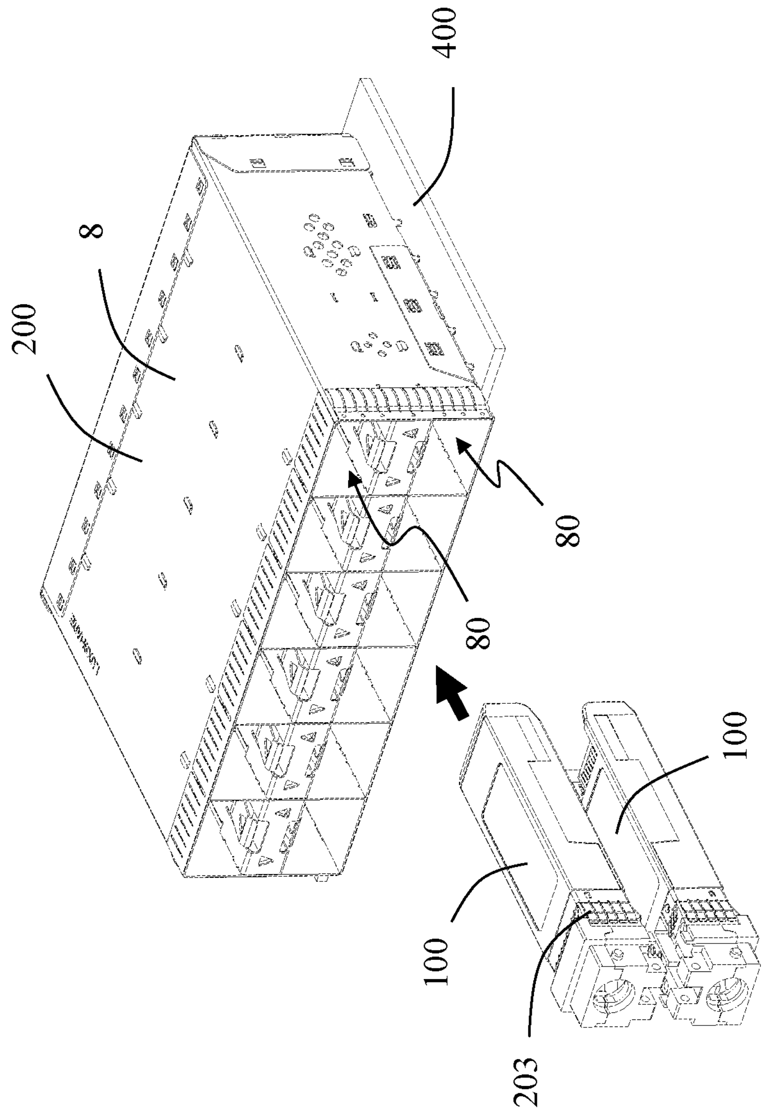
FIG. 2 is a partial perspective exploded view of FIG. 1, wherein the plug connector and the receptacle connector are separated from each other.

Referring to FIGS. 1 and 2, the present disclosure discloses a connector assembly 300 including a plurality of plug connectors 100 and a receptacle connector 200 for receiving the plug connectors 100. In the illustrated embodiment of the present disclosure, the receptacle connector 200 is used to be mounted on a circuit board 400. In some embodiments of the present disclosure, the plug connector 100 is a plug connector based on SFP, QSFP, OSFP, QSFP-DD, SFP-DD, or DSFP etc. Correspondingly, the receptacle connector 200 is a receptacle connector based on SFP, QSFP, OSFP, QSFP-DD, SFP-DD or DSFP etc.

Referring to FIGS. 3 to 9, the plug connector 100 includes a tongue plate 1, a metal shell 2 located on a periphery of the tongue plate 1, and at least one plug power terminal 3.

Figure 5:
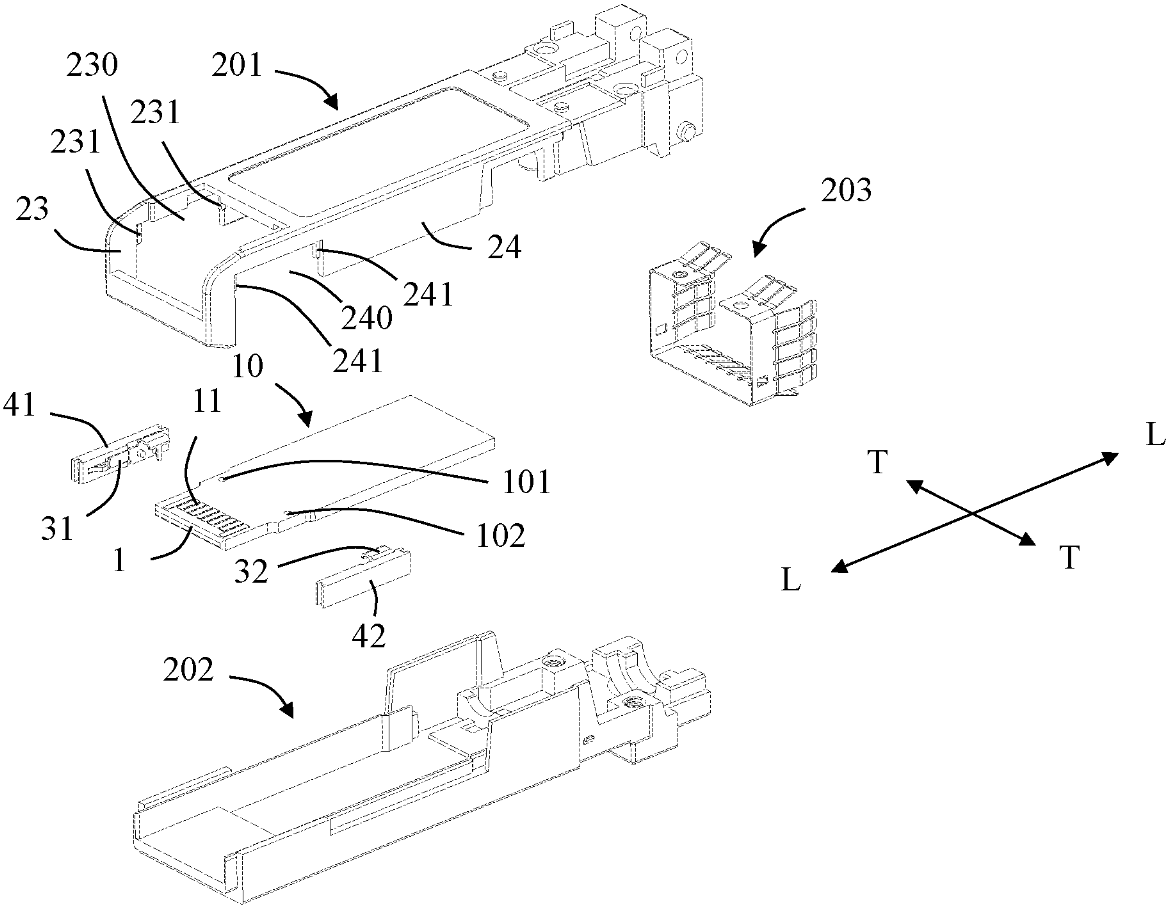
FIG. 5 is a partially exploded perspective view of FIG. 3.
Figure 6:
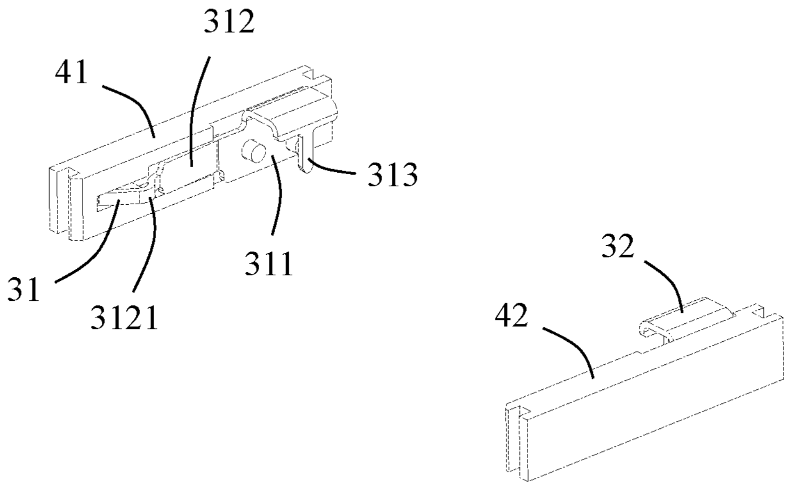
FIG. 6 is a perspective view of a first plug power terminal and a first insulating mounting block assembled together, and a second plug power terminal and a second insulating mounting block assembled together.
Figure 7:
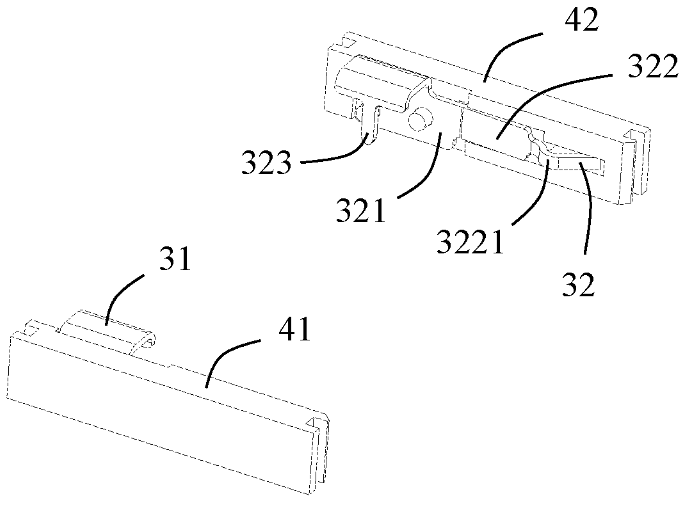
FIG. 7 is a perspective schematic view of FIG. 6 from another angle.
Figure 8:
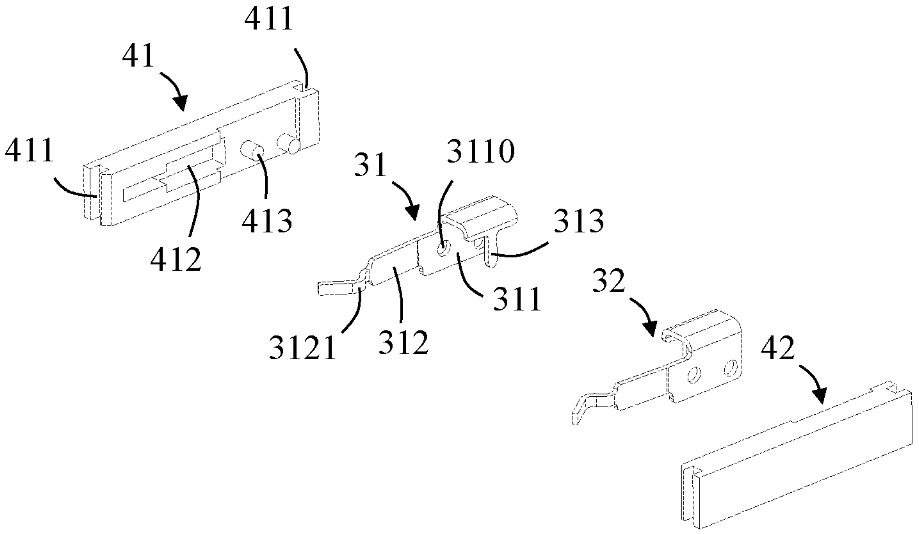
FIG. 8 is a perspective exploded view of FIG. 6.
Figure 9:
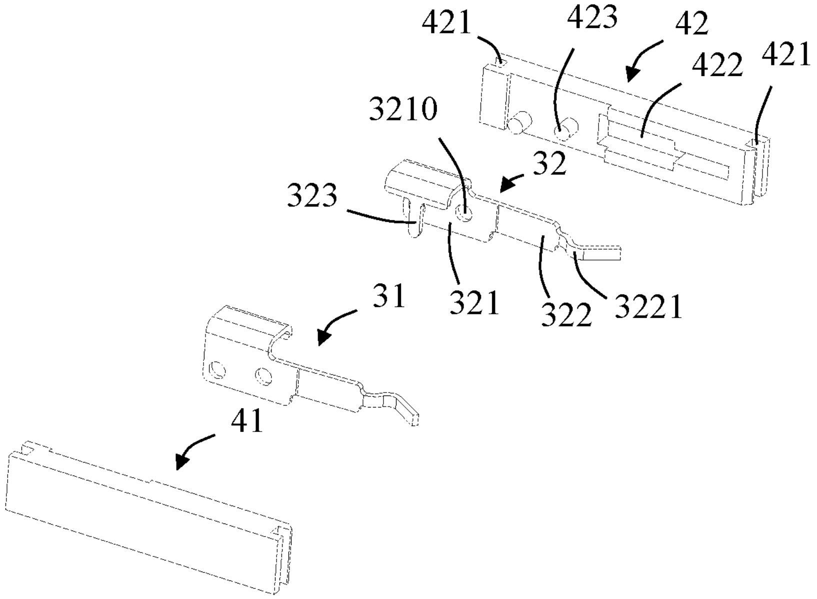
FIG. 9 is a perspective exploded view of FIG. 8 from another angle.
Figure 10:
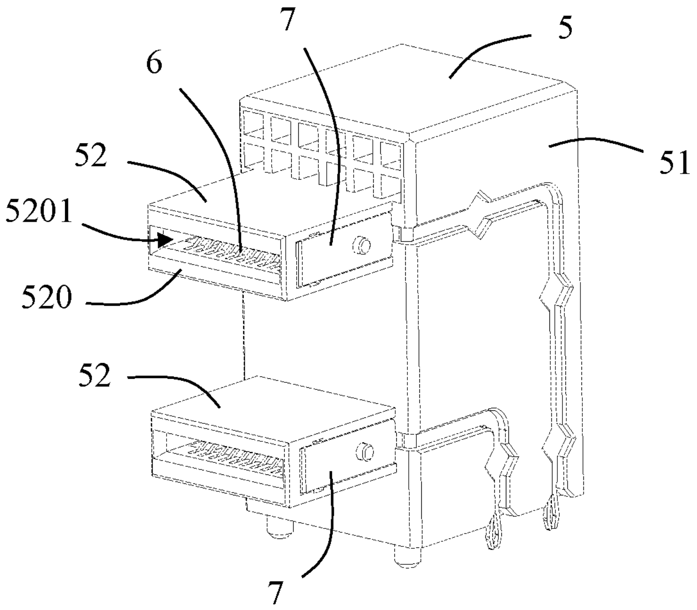
FIG. 10 is a perspective schematic view of the receptacle connector in accordance with an embodiment of the present disclosure.
Figure 11:
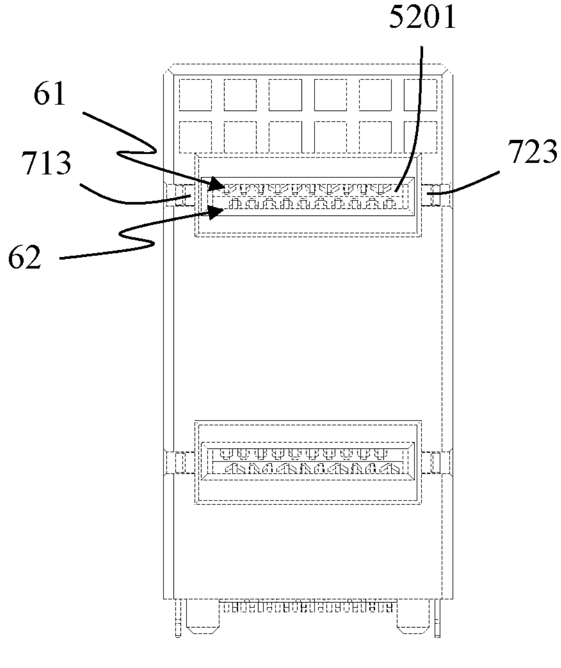
FIG. 11 is a front view of FIG. 10.
Figure 12:
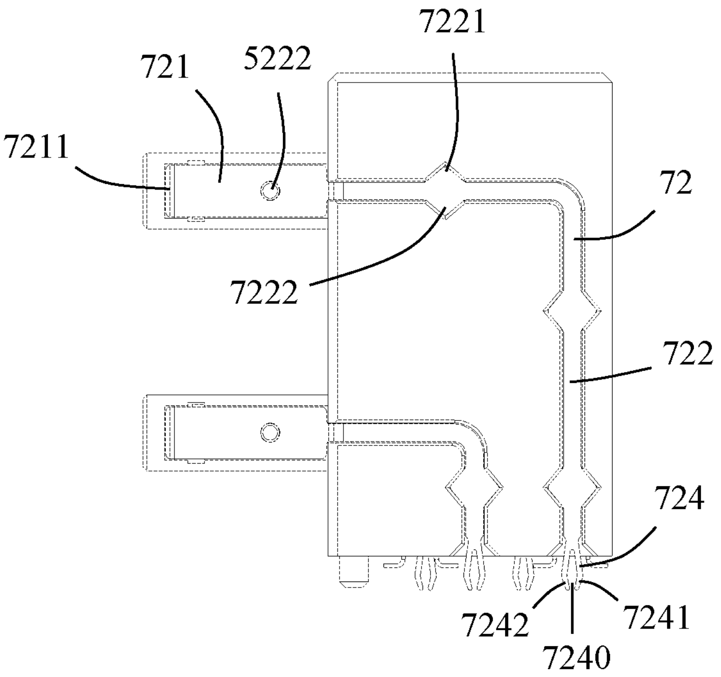
FIG. 12 is a right side view of FIG. 10.
Figure 13:
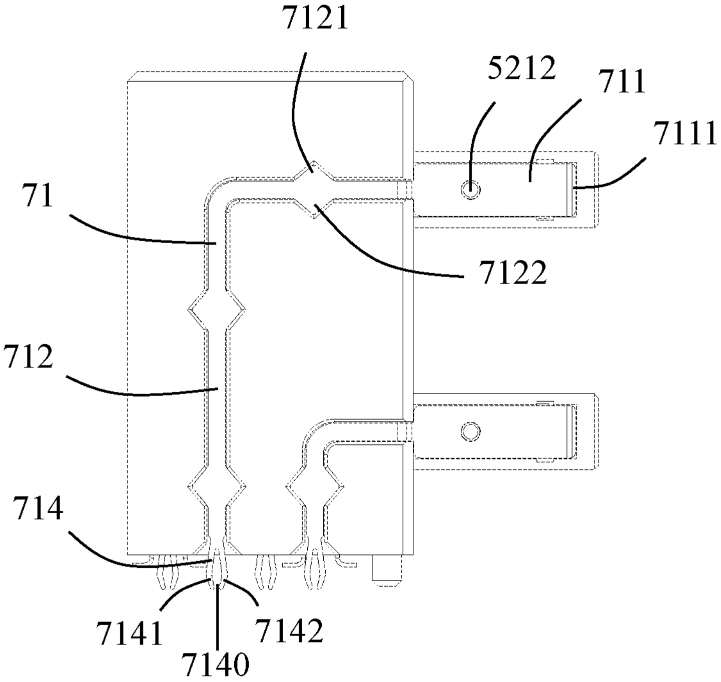
FIG. 13 is a left side view of FIG. 10.
Figure 14:
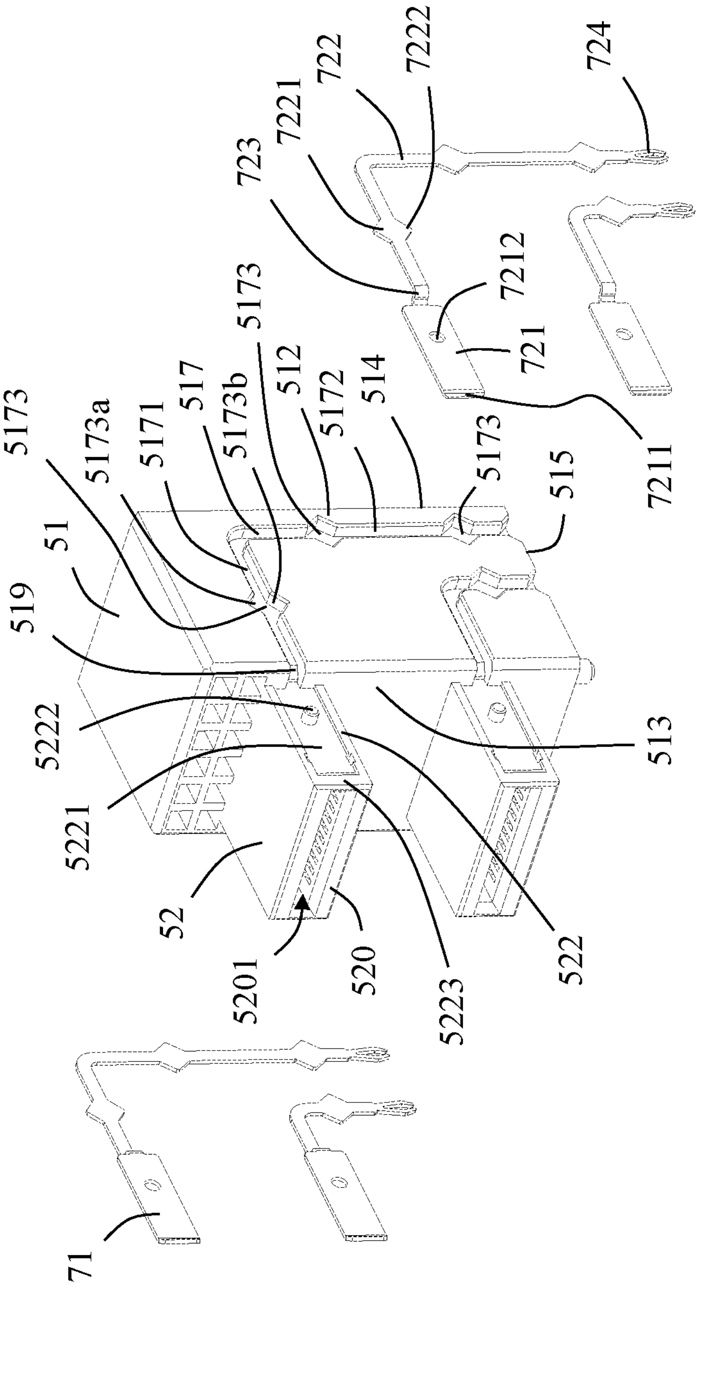
FIG. 14 is a partially exploded perspective view of FIG. 10.
Figure 15:
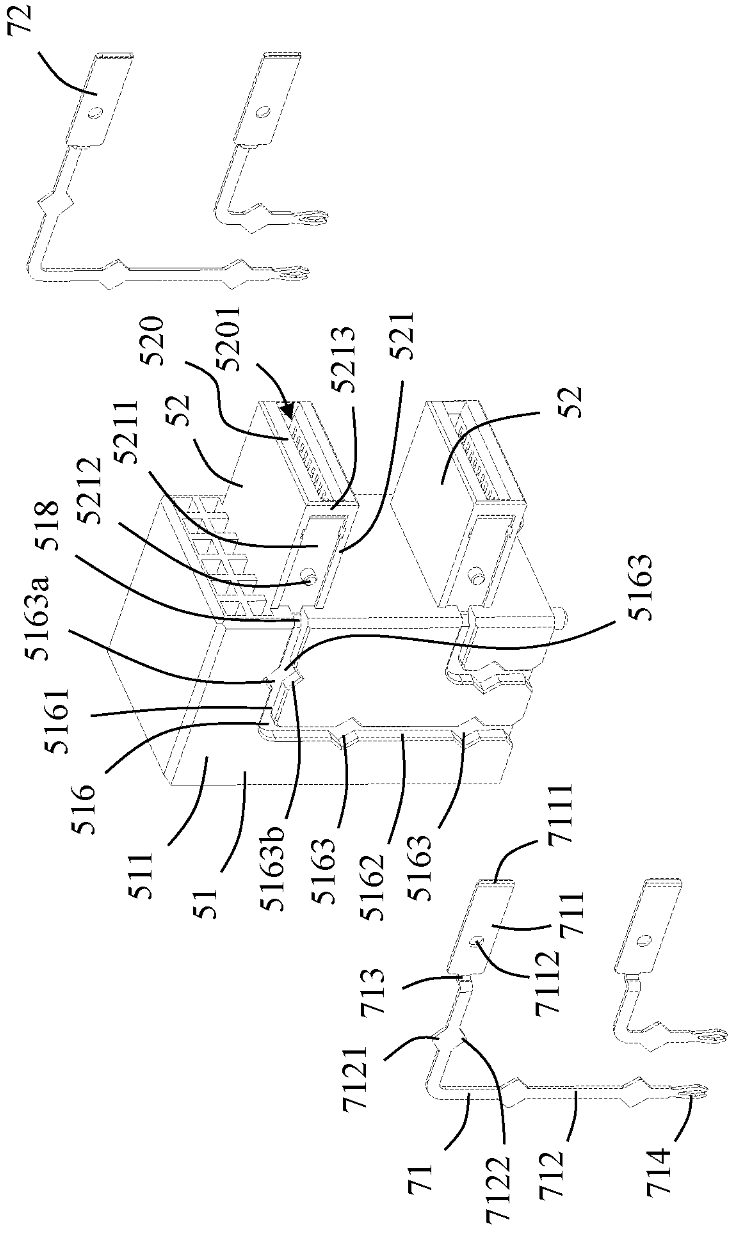
FIG. 15 is a partial perspective exploded view of FIG. 14 from another angle.

In the illustrated embodiment of the present disclosure, the tongue plate 1 has a flat-plate shape and extends along a longitudinal direction L-L. At least one side of the tongue plate 1 is provided with a plurality of conductive pads 11. In the illustrated embodiment of the present disclosure, two opposite sides (for example, upper and lower sides) of the tongue plate 1 are provided with the plurality of conductive pads 11, respectively. The conductive pads 11 located on a same side of the tongue plate 1 are arranged at intervals along a transverse direction T-T perpendicular to the longitudinal direction L-L. Referring to FIG. 5, in the illustrated embodiment of the present disclosure, the plug connector 100 includes a built-in circuit board 10, and the tongue plate 1 is located on the built-in circuit board 10. That is, a part (for example, a front end portion) of the built-in circuit board 10 forms the tongue plate 1. The built-in circuit board 10 includes a first mounting hole 101 and a second mounting hole 102 located on two sides (for example, left and right sides), respectively. It is understandable to those skilled in the art that a plurality of electronic components may also be provided on the built-in circuit board 10 so as to process power and/or signals.

Figure 3:
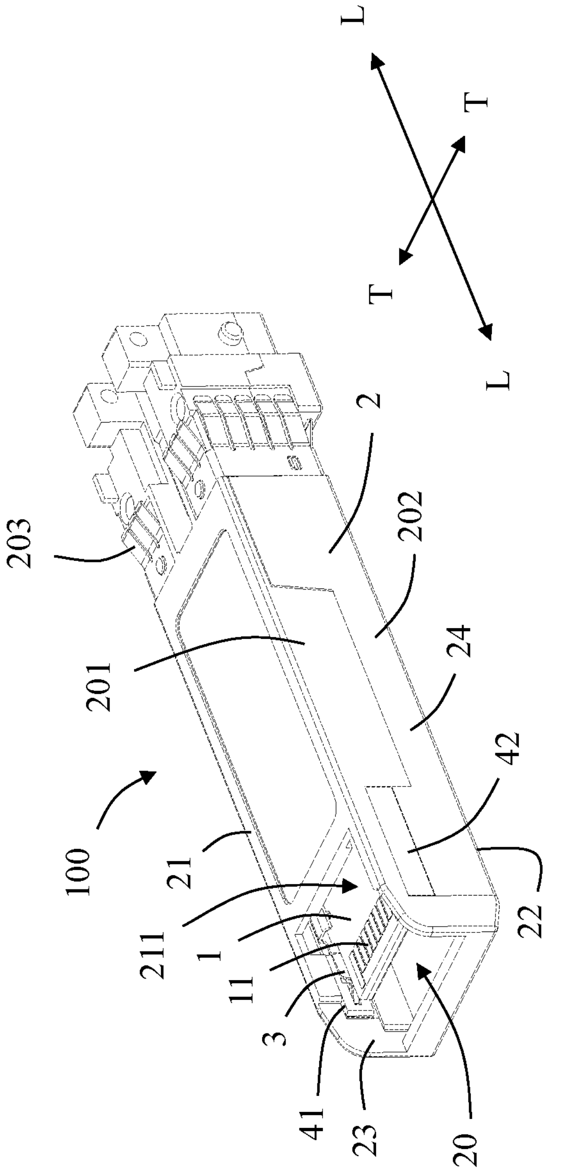
FIG. 3 is a perspective schematic view of the plug connector in accordance with an embodiment of the present disclosure.
Figure 4:
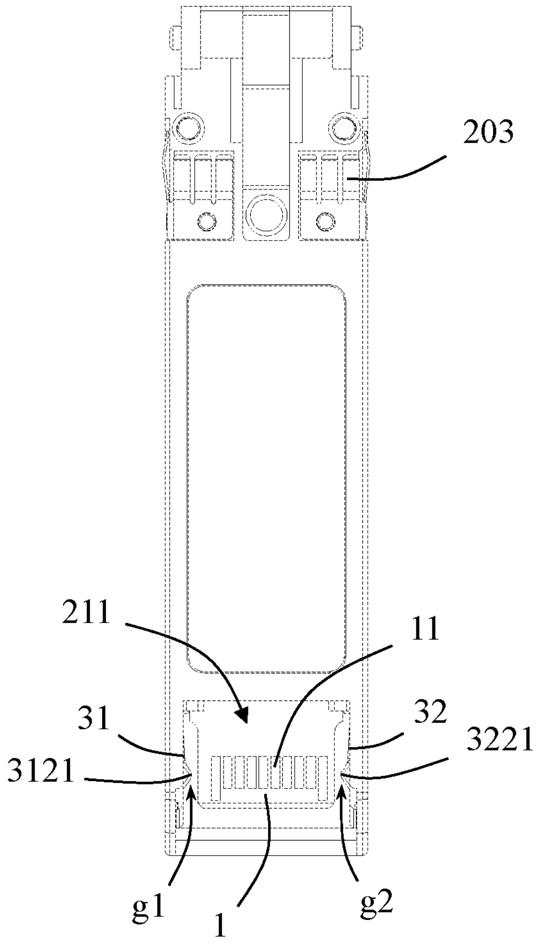
FIG. 4 is a top view of FIG. 3.

Referring to FIGS. 3 to 5, in the illustrated embodiment of the present disclosure, the metal shell 2 includes an upper metal shell 201 and a lower metal shell 202. The upper metal shell 201 and the lower metal shell 202 are fixed to each other by assembly. After assembly, the metal shell 2 includes a first wall portion 21 (for example, a top wall), a second wall portion 22 (for example, a bottom wall) opposite to the first wall portion 21, a first side wall 23 connecting one side (for example, a left side) of the first wall portion 21 and one side (for example, a left side) of the second wall portion 22, and a second side wall 24 connecting another side (for example, a right side) of the first wall portion 21 and another side (for example, a right side) of the second wall portion 22. The first wall portion 21, the second wall portion 22, the first side wall 23 and the second side wall 24 are jointly enclosed to form a receiving space 20 for accommodating the tongue plate 1. The first wall portion 21 is provided with an opening 211 extending through the first wall portion 21 in a direction away from the second wall portion 22 (for example, a bottom-to-top direction). The opening 211 is in communication with the receiving space 20. The conductive pads 11 on at least one side (for example, an upper side) of the tongue plate 1 are exposed in the opening 211.

Referring to FIG. 5, the first side wall 23 of the upper metal shell 201 includes two first positioning tabs 231 arranged at intervals in the longitudinal direction L-L, and a first mounting groove 230 located between the two first positioning tabs 231. Each of the first positioning tabs 231 extends in a vertical direction. Similarly, the second side wall 24 of the upper metal shell 201 includes two second positioning tabs 241 arranged at intervals in the longitudinal direction L-L, and a second mounting groove 240 located between the two second positioning tabs 241. Each of the second positioning tabs 241 extends in the vertical direction. Preferably, the first side wall 23 and the second side wall 24 are symmetrically arranged on left and right sides of the receiving space 20.

In addition, in order to improve the reliability of the plug connector 100 after being inserted into the receptacle connector 200 and to improve the grounding effect of the plug connector 100 and the receptacle connector 200, the plug connector 100 further includes a grounding spring 203 fixed to the metal shell 2. Referring to FIGS. 3 to 5, in the illustrated embodiment of the present disclosure, the grounding spring 203 is soldered (for example, spot soldered) to the metal shell 2. The grounding spring 203 is substantially frame-shaped. The grounding spring 203 respectively corresponds to and protrude outwardly beyond the first wall portion 21, the second wall portion 22, the first side wall 23 and the second side wall 24. That is, the first wall portion 21, the second wall portion 22, the first side wall 23 and the second side wall 24 are respectively provided with the grounding spring 203. The grounding spring 203 is used to abut against the receptacle connector 200 so as to improve the grounding effect.

Referring to FIGS. 5 to 9, in the illustrated embodiment of the present disclosure, the plug power terminal 3 includes a first plug power terminal 31 and a second plug power terminal 32 located on both sides (for example, left and right sides) of the conductive pads 11, respectively, along the transverse direction T-T.

The first plug power terminal 31 includes a first fixing portion 311, a first extension arm 312 extending forwardly from the first fixing portion 311 along the longitudinal direction L-L, and a first mounting tail 313 extending from the first fixing portion 311. The first extension arm 312 includes a first elastic mating portion 3121 located at a free end of the first extension arm 312 in the longitudinal direction L-L. The first elastic mating portion 3121 protrudes toward the tongue plate 1 along the transverse direction T-T and protrudes into the receiving space 20 from one side. In the illustrated embodiment of the present disclosure, the first elastic mating portion 3121 has an arc shape. The first mounting tail 313 is located on an inner side of the first plug power terminal 31 as a whole, and is used to be inserted into the first mounting hole 101 of the built-in circuit board 10. Preferably, the first mounting tail 313 is soldered to the built-in circuit board 10 so as to achieve electrical connection with the built-in circuit board 10.

In order to better install and protect the first plug power terminal 31, the plug connector 100 further includes a first insulating mounting block 41 which is matched with the first plug power terminal 31. In the illustrated embodiment of the present disclosure, the first insulating mounting block 41 is fixed to the first side wall 23 of the metal shell 2. The first insulating mounting block 41 is clamped between the upper metal shell 201 and the lower metal shell 202. Specifically, the first insulating mounting block 41 includes first positioning slots 411 located at opposite ends of the first insulating mounting block 41 along the longitudinal direction L-L. The first positioning slots 411 are used for insertion of the first positioning tabs 231 so as to position and fix the first insulating mounting block 41 in the first mounting grooves 230. A side of the first insulating mounting block 41 facing the first plug power terminal 31 further includes a first relief slot 412 corresponding to the first elastic mating portion 3121 and providing a space for the first elastic mating portion 3121 to deform in a direction away from the receiving space 20. In addition, a side of the first insulating mounting block 41 facing the first plug power terminal 31 further includes a first positioning post 413. The first fixing portion 311 of the first plug power terminal 31 includes a first positioning hole 3110 that cooperates with the first positioning post 413. This arrangement is beneficial for fixing the first plug power terminal 31 to the first insulating mounting block 41.

Similarly, the second plug power terminal 32 includes a second fixing portion 321, a second extension arm 322 extending forwardly from the second fixing portion 321 along the longitudinal direction L-L, and a second mounting tail 323 extending from the second fixing portion 321. The second extension arm 322 includes a second elastic mating portion 3221 located at a free end of the second extension arm 322 in the longitudinal direction L-L. The second elastic mating portion 3221 protrudes toward the tongue plate 1 along the transverse direction T-T and protrudes into the receiving space 20 from another side opposite to the first elastic mating portion 3121. In the illustrated embodiment of the present disclosure, the second elastic mating portion 3221 has an arc shape. The second mounting tail 323 is located on an inner side of the second plug power terminal 32 as a whole, and is used to be inserted into the second mounting hole 102 of the built-in circuit board 10. Preferably, the second mounting tail 323 is soldered to the built-in circuit board 10 so as to realize electrical connection with the built-in circuit board 10.

In order to better install and protect the second plug power terminal 32, the plug connector 100 further includes a second insulating mounting block 42 which is matched with the second plug power terminal 32. In the illustrated embodiment of the present disclosure, the second insulating mounting block 42 is fixed to the second side wall 24 of the metal shell 2. The second insulating mounting block 42 is clamped between the upper metal shell 201 and the lower metal shell 202. Specifically, the second insulating mounting block 42 includes second positioning slots 421 located at opposite ends of the second insulating mounting block 42 along the longitudinal direction L-L. The second positioning slots 421 are used for insertion of the second positioning tabs 241 so as to position and fix the second insulating mounting block 42 in the second mounting grooves 240. A side of the second insulating mounting block 42 facing the second plug power terminal 32 further includes a second relief slot 422 corresponding to the second elastic mating portion 3221 and providing a space for the second elastic mating portion 3221 to deform in a direction away from the receiving space 20. In addition, a side of the second insulating mounting block 42 facing the second plug power terminal 32 further includes a second positioning post 423. The second fixing portion 321 of the second plug power terminal 32 includes a second positioning hole 3210 that cooperates with the second positioning post 423. This arrangement is beneficial to fix the second plug power terminal 32 to the second insulating mounting block 42.

Referring to FIG. 4, in an embodiment of the present disclosure, the first plug power terminal 31 and the second plug power terminal 32 are symmetrically arranged on opposite sides of the tongue plate 1 (for example, the left and right sides). A first gap g1 is formed between the first elastic mating portion 3121 and the tongue plate 1 along the transverse direction T-T. A second gap g2 is formed between the second elastic mating portion 3221 and the tongue plate 1 along the transverse direction T-T.

Referring to FIGS. 1, 2 and 10 to 19, the receptacle connector 200 includes an insulating body 5, a plurality of conductive terminals 6, at least one receptacle power terminal 7, and a metal shielding shell 8 located on a periphery of the insulating body 5.

The insulating body 5 includes a base 51 and at least one mating protrusion 52 extending from the base 51. In the illustrated embodiment of the present disclosure, two mating protrusions 52 are provided and spaced up and down. That is, the receptacle connector 200 is a receptacle connector with stacking ports. Since the upper mating protrusion 52 is similar in structure to the lower mating protrusion 52, only the upper mating protrusion 52 and its corresponding elements will be described below as an example. The lower mating protrusion 52 and its corresponding elements can be understood referring to the upper mating protrusion 52 and its corresponding elements.

Referring to FIGS. 10 to 15, the base 51 includes a first side surface 511, a second side surface 512 opposite to the first side surface 511, a front end surface 513 connecting the first side surface 511 and the second side surface 512, a rear end surface 514 opposite to the front end surface 513, and a mounting surface 515 located at a bottom of the base 51. The base 51 further includes a first receiving groove 516 recessed inwardly from the first side surface 511, a second receiving groove 517 recessed inwardly from the second side surface 512, a first slot 518 recessed from the front end surface 513 and communicated with the first receiving groove 516, and a second slot 519 recessed from the front end surface 513 and communicated with the second receiving groove 517.

The first receiving groove 516 is substantially L-shaped and includes a first horizontal receiving groove 5161 and a first vertical receiving groove 5162. The first horizontal receiving groove 5161 extends forwardly through the front end surface 513 and is in communication with the first slot 518. The first vertical receiving groove 5162 extends downwardly through the mounting surface 515. Each of the first horizontal receiving groove 5161 and the first vertical receiving groove 5162 includes at least one first flared groove 5163. In the illustrated embodiment of the present disclosure, the first horizontal receiving groove 5161 includes one first flared groove 5163. The first vertical receiving groove 5162 includes two first flaring grooves 5163. Each first flaring groove 5163 includes a first extension groove **5163*a* and a second extension groove 5163*b* which extend in opposite directions. In the illustrated embodiment of the present disclosure, both the first extension groove 5163*a* and the second extension groove 5163*b* are substantially triangular. The first flaring groove 5163 is substantially diamond-shaped. It is understandable to those skilled in the art that in the first horizontal receiving groove 5161 and the first vertical receiving groove 5162, the number and shape of the first flared grooves 5163** can be flexibly set according to needs.

The second receiving groove 517 is substantially L-shaped and includes a second horizontal receiving groove 5171 and a second vertical receiving groove 5172. The second horizontal receiving groove 5171 extends forwardly through the front end surface 513 and is communication with the second slot 519. The second vertical receiving groove 5172 extends downwardly through the mounting surface 515. Each of the second horizontal receiving groove 5171 and the second vertical receiving groove 5172 includes at least one second flared groove 5173. In the illustrated embodiment of the present disclosure, the second horizontal receiving groove 5171 includes one second flared groove 5173. The second vertical receiving groove 5172 includes two second flaring grooves 5173. Each second flaring groove 5173 includes a third extension groove **5173*a* and a fourth extension groove 5173*b* which extend in opposite directions. In the illustrated embodiment of the present disclosure, both the third extension groove 5173*a* and the fourth extension groove 5173*b* are substantially triangular. The second flaring groove 5173 is substantially diamond-shaped. It is understandable to those skilled in the art that in the second horizontal receiving groove 5171 and the second vertical receiving groove 5172, the number and shape of the second flared grooves 5173** can be flexibly set according to needs.

The mating protrusion 52 includes a mating surface 520 and a mating slot 5201 extending through the mating surface 520. In the illustrated embodiment of the present disclosure, the mating protrusion 52 includes a first side end wall 521 and a second side end wall 522 which are located on opposite sides of the mating slot 5201, respectively. An outer side of the first side end wall 521 includes a first groove 5211 and a first protrusion 5212 protruding outwardly. In the illustrated embodiment of the present disclosure, the first groove 5211 does not extend inwardly through the first side end wall 521. That is, the first groove 5211 does not communicate with the mating slot 5201. In addition, the first groove 5211 does not extend forwardly through the first side end wall 521. That is, the first side end wall 521 includes a first blocking portion 5213 located at a front end of the first groove 5211. An outer side of the second side end wall 522 includes a second groove 5221 and a second protrusion 5222 protruding outwardly. In the illustrated embodiment of the present disclosure, the second groove 5221 does not extend inwardly through the second side end wall 522. That is, the second groove 5221 does not communicate with the mating slot 5201. In addition, the second groove 5221 does not extend forwardly through the second side end wall 522. That is, the second side end wall 522 includes a second blocking portion 5223 located at a front end of the second groove 5221.

Corresponding to one mating protrusion 52, the receptacle power terminal 7 includes a first receptacle power terminal 71 and a second receptacle power terminal 72. Preferably, the first receptacle power terminal 71 and the second receptacle power terminal 72 are symmetrically arranged on opposite sides of the mating slot 5201. The first receptacle power terminal 71 includes a first plate-shaped contact portion 711, a first main body portion 712, a first bent portion 713 connecting the first plate-shaped contact portion 711 and the first main body portion 712, and a first fork-shaped mounting portion 714 extending downwardly from the first main body portion 712.

The first plate-shaped contact portion 711 is received in the first groove 5211 of the mating protrusion 52. In an embodiment of the present disclosure, an outer surface of the first plate-shaped contact portion 711 does not protrude beyond an outer surface of the first blocking portion 5213. That is, the outer surface of the first plate-shaped contact portion 711 is flush with the outer surface of the first blocking portion 5213, or the outer surface of the first plate-shaped contact portion 711 is located inside the outer surface of the first blocking portion 5213. The first plate-shaped contact portion 711 includes a first deflection portion 7111 located at its front end and extending into the first groove 5211. The first deflection portion 7111 is located at the rear end of the first blocking portion 5213 along an insertion direction of the plug connector 100. With this arrangement, the first blocking portion 5213 can provide a better protection for the first plate-shaped contact portion 711 and prevent the first plate-shaped contact portion 711 from being damaged by the plug connector 100 or other plug connectors. Preferably, the outer surface of the first plate-shaped contact portion 711 is flush with the outer surface of the first blocking portion 5213. With this arrangement, on one hand, the first plate-shaped contact portion 711 can be brought into contact with the first plug power terminal 31 of the plug connector 100; and on the other hand, the plate-shaped contact portion 711 can be well protected.

In addition, the first plate-shaped contact portion 711 further includes a first through hole 7112 which cooperates with the first protrusion 5212, so as to facilitate positioning the first plate-shaped contact portion 711 in the first groove 5211. The first plate-shaped contact portion 711 is substantially located in a vertical plane. This arrangement can shorten the width required for the arrangement of the first plate-shaped contact portion 711 as much as possible, and is beneficial to reduce the profile of the receptacle connector 200.

In the illustrated embodiment of the present disclosure, the first bent portion 713 is received in the first slot 518. The first fork-shaped mounting portion 714 extends downwardly and protrudes beyond the mounting surface 515 so as to be electrically connected to the circuit board 400 (for example, by soldering). The first plate-shaped contact portion 711 and the first main body portion 712 are located in different vertical planes. In a width direction W-W of the mating protrusion 52, the first main body portion 712 is farther away from the mating slot 5201 than the first plate-shaped contact portion 711. With this arrangement, when the first plate-shaped contact portion 711 is in contact with the first plug power terminal 31 of the plug connector 100 and the working voltage or the instantaneous voltage is high, the influence of the conductive terminals 6 and the conductive pads 11 in contact with each other and data transmission can be reduced.

The first main body portion 712 is received in the first receiving groove 516. In the illustrated embodiment of the present disclosure, the first main body portion 712 includes a first extension protrusion 7121 positioned in the first extension groove 5163*a*, and a second extension protrusion 7122 positioned in the second extension groove 5163*b*.

The first fork-shaped mounting portion 714 includes a first mounting leg 7141, a second mounting leg 7142, and a first gap 7140 formed between the first mounting leg 7141 and the second mounting leg 7142. An end of the first mounting leg 7141 is inclined toward the second mounting leg 7142. An end of the second mounting leg 7142 is inclined toward the first mounting leg 7141. This arrangement facilitates the insertion of the first fork-shaped mounting portion 714 through the circuit board 400 so as to achieve pre-positioning. In the illustrated embodiment of the present disclosure, the first fork-shaped mounting portion 714 is soldered and fixed to the circuit board 400 so as to achieve electrical connection with the circuit board 400.

The second receptacle power terminal 72 includes a second plate-shaped contact portion 721, a second main body portion 722, a second bent portion 723 connecting the second plate-shaped contact portion 721 and the second main body portion 722, and a second fork-shaped mounting portion 724 extending downwardly from the second main body portion 722.

The second plate-shaped contact portion 721 is received in the second groove 5221 of the mating protrusion 52. In an embodiment of the present disclosure, an outer surface of the second plate-shaped contact portion 721 does not protrude beyond an outer surface of the second blocking portion 5223. That is, the outer surface of the second plate-shaped contact portion 721 is flush with the outer surface of the second blocking portion 5223, or the outer side surface of the second plate-shaped contact portion 721 is located inside the outer side surface of the second blocking portion 5223. The second plate-shaped contact portion 721 includes a second deflection portion 7211 located at its front end and extending into the second groove 5221. The second deflection portion 7211 is located at a rear end of the second blocking portion 5223 along the insertion direction of the plug connector 100. With this arrangement, the second blocking portion 5223 can provide a better protection for the second plate-shaped contact portion 721 and prevent the second plate-shaped contact portion 721 from being damaged by the plug connector 100 or other plug connectors. Preferably, the outer surface of the second plate-shaped contact portion 721 is flush with the outer surface of the second blocking portion 5223. With this arrangement, on one hand, the second plate-shaped contact portion 721 can be brought into contact with the second plug power terminal 32 of the plug connector 100; and on the other hand, the plate-shaped contact portion 721 can be well protected.

In addition, the second plate-shaped contact portion 721 further includes a second through hole 7212 which cooperates with the second protrusion 5222, so as to facilitate positioning the second plate-shaped contact portion 721 in the second groove 5221. The second plate-shaped contact portion 721 is substantially located in a vertical plane. This arrangement can shorten the width required for the arrangement of the second plate-shaped contact portion 721 as much as possible, which is beneficial to reduce the profile of the receptacle connector 200.

In the illustrated embodiment of the present disclosure, the second bent portion 723 is received in the second slot 519. The second fork-shaped mounting portion 724 extends downwardly and protrudes beyond the mounting surface 515 so as to be electrically connected to the circuit board 400 (for example, by soldering). The second plate-shaped contact portion 721 and the second main body portion 722 are located in different vertical planes. In the width direction W-W of the mating protrusion 52, the second main body part 722 is farther away from the mating slot 5201 than the second plate-shaped contact part 721. With this arrangement, when the second plate-shaped contact portion 721 is in contact with the second plug power terminal 32 of the plug connector 100 and the working voltage or instantaneous voltage is high, the influence of the conductive terminal 6 and the conductive pad 11 in contact with each other and data transmission can be reduced.

The second main body portion 722 is received in the second receiving groove 517. In the illustrated embodiment of the present disclosure, the second main body portion 722 includes a third extension protrusion 7221 positioned in the third extension groove 5173*a* and a fourth extension protrusion 7222 positioned in the fourth extension groove 5173*b*.

The second fork-shaped mounting portion 724 includes a third mounting leg 7241, a fourth mounting leg 7242, and a second gap 7240 formed between the third mounting leg 7241 and the fourth mounting leg 7242. An end of the third mounting leg 7241 is inclined toward the fourth mounting leg 7242. An end of the fourth mounting leg 7242 is inclined toward the third mounting leg 7241. This arrangement facilitates the insertion of the second fork-shaped mounting portion 724 through the circuit board 400 so as to achieve pre-positioning. In the illustrated embodiment of the present disclosure, the second fork-shaped mounting portion 724 is soldered and fixed to the circuit board 400 so as to achieve electrical connection with the circuit board 400.

Figure 16:
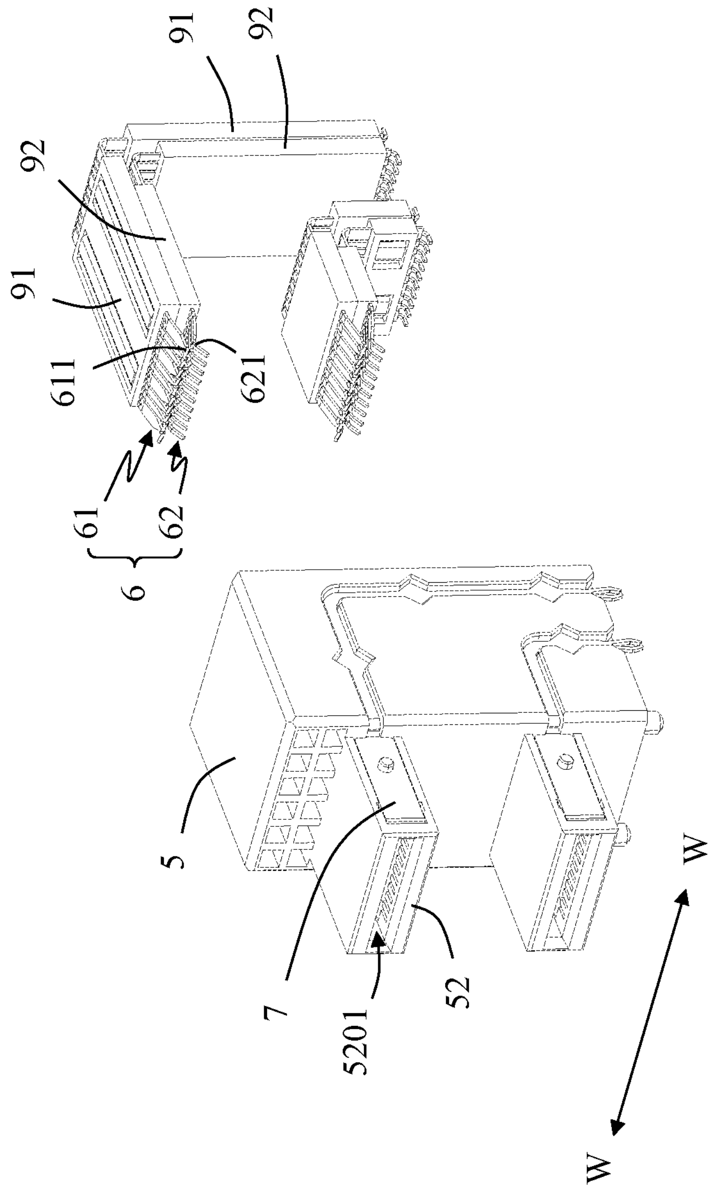
FIG. 16 is a partial perspective exploded view of FIG. 10, in which a terminal module is separated.
Figure 17:
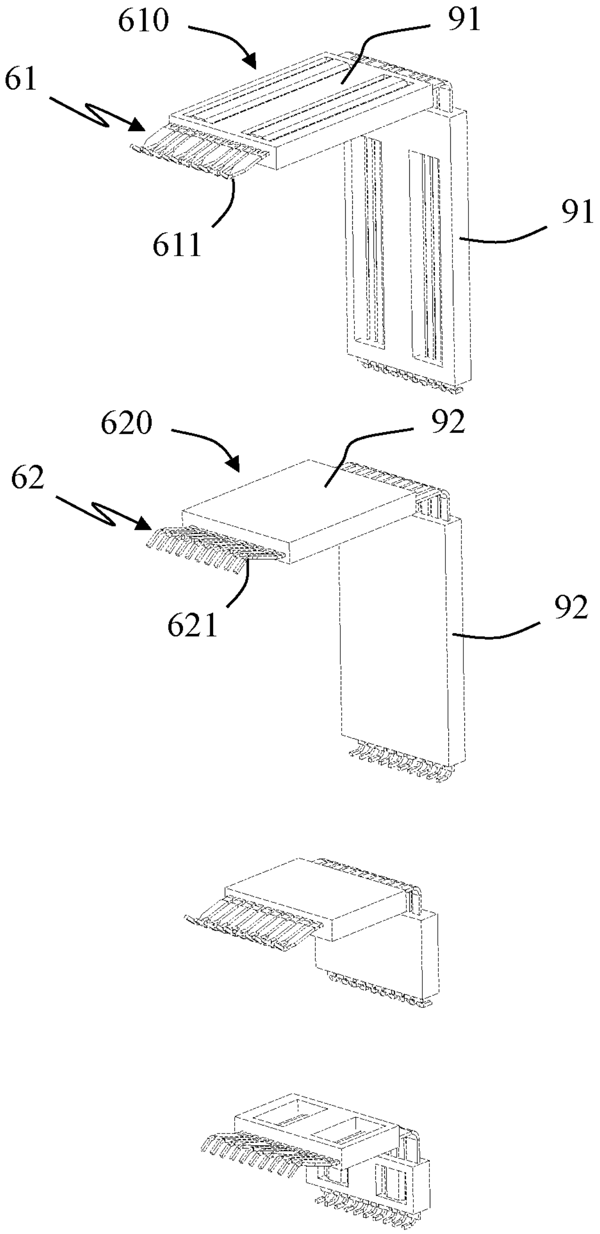
FIG. 17 is a partial perspective exploded view of the terminal module in FIG. 16.
Figure 18:
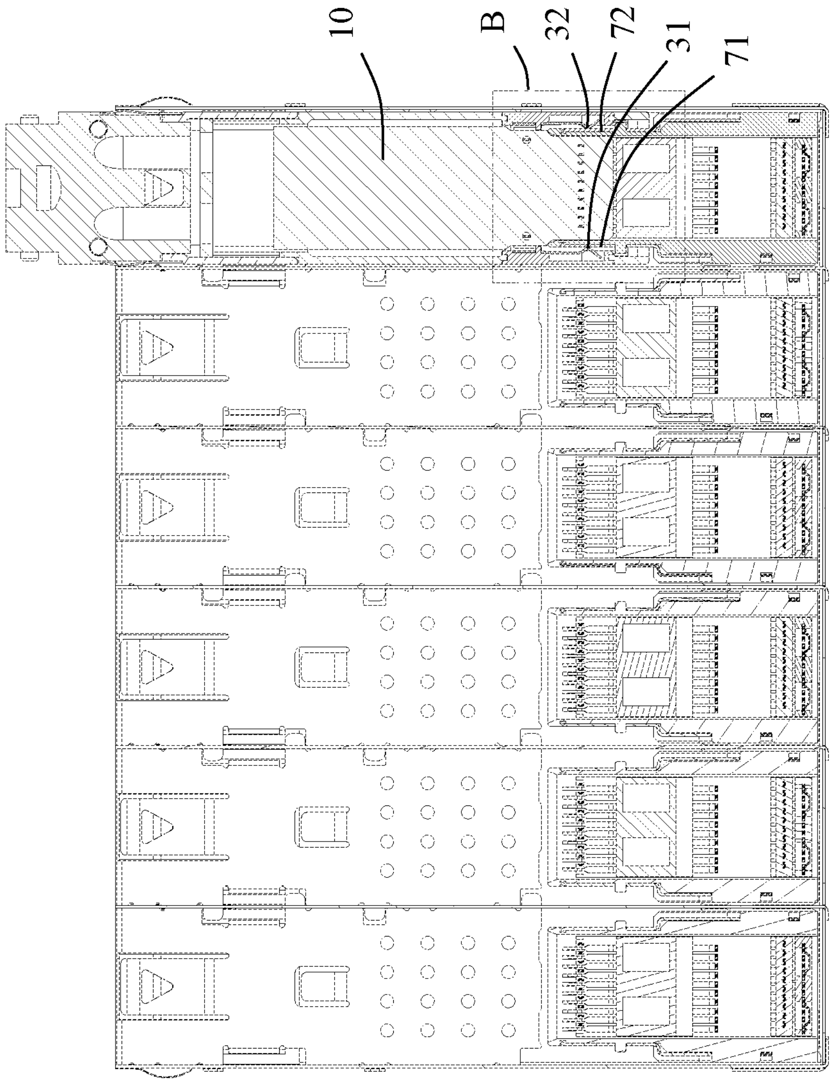
FIG. 18 is a schematic cross-sectional view taken along line A-A in FIG. 1.
Figure 19:
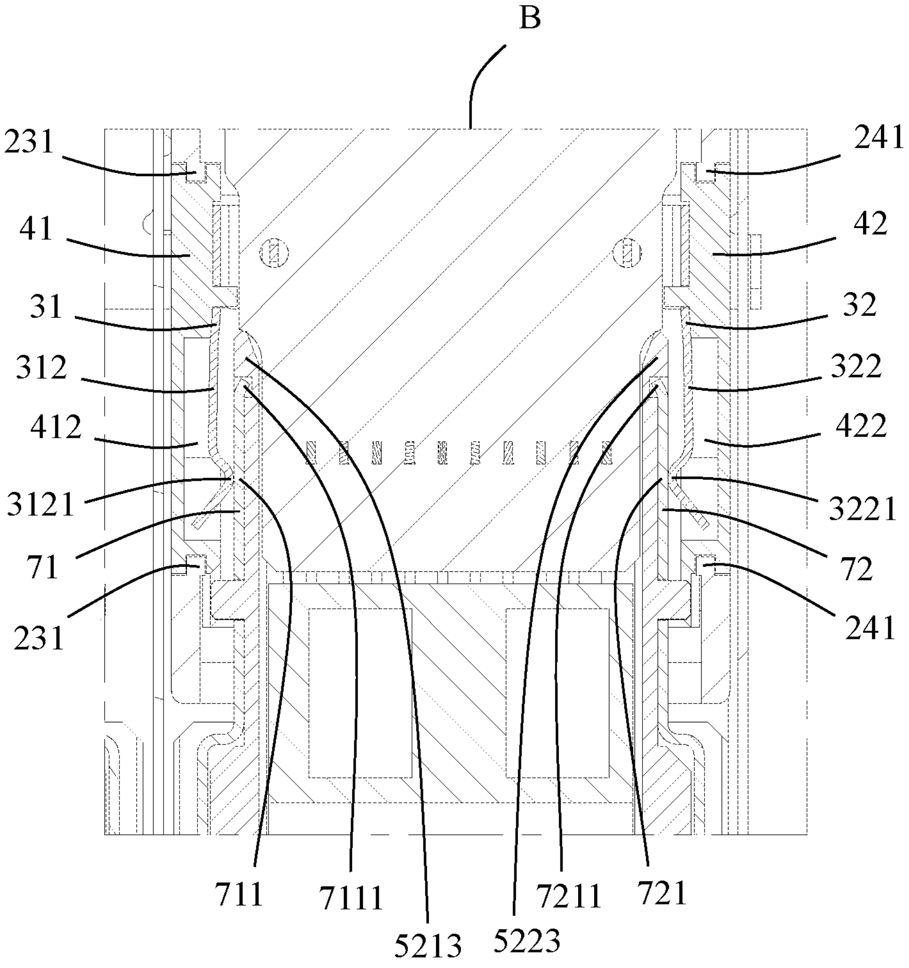
FIG. 19 is a partial enlarged view of a frame part B in FIG. 18.

Referring to FIGS. 16 and 17, corresponding to one mating protrusion 52, the plurality of conductive terminals 6 includes a first row of conductive terminals 61 and a second row of conductive terminals 62. The first row of each conductive terminal 61 includes a first elastic contact portion 611 extending into the mating slot 5201. The second row of each conductive terminal 62 includes a second elastic contact portion 621 extending into the mating slot 5201. The first elastic contact portions 611 and the second elastic contact portions 621 are located on opposite sides of the mating slot 5201 (for example, upper and lower sides), respectively. The first elastic contact portions 611 of the first row of conductive terminals 61 are arranged at intervals along the width direction W-W of the mating protrusion 52. The second elastic contact portions 621 of the second row of conductive terminals 62 are arranged at intervals along the width direction W-W of the mating protrusion 52. The first elastic contact portions 611 protrude toward the second elastic contact portions 621. The second elastic contact portions 621 protrude toward the first elastic contact portions 611. The first elastic contact portions 611 and the second elastic contact portions 621 are used to clamp the tongue plate 1 so as to improve the stability of contact with the conductive pads 11.

In the illustrated embodiment of the present disclosure, the first row of conductive terminals 61 and the first insulating block 91 are fixed to form a first terminal module 610. For example, the first row of conductive terminals 61 are insert-molded with the first insulating block 91 so as to improve the combination tightness of the two and improve the convenience of being assembled to the insulating body 5. Similarly, the second row of conductive terminals 62 and the second insulating block 92 are fixed to form a second terminal module 620. For example, the second row of conductive terminals 62 are insert-molded with the second insulating block 92 so as to improve the combination tightness of the two and improve the convenience of being assembled to the insulating body 5.

Of course, it is understandable to those skilled in the art that the first row of conductive terminals 61 and the second row of conductive terminals 62 can also be installed and fixed to the insulating body 5 by assembly.

As shown in FIG. 2, the metal shielding shell 8 defines a receiving cavity 80 located at a front end of the mating protrusion 52 and communicating with the mating slot 5201. In the illustrated embodiment of the present disclosure, a plurality of receiving cavities 80 are provided. Each receiving cavity 80 communicates with the corresponding mating slot 5201 to receive the corresponding plug connector 100.

Referring to FIGS. 1, 2, 18 and 19, when the plug connector 100 is inserted into the receptacle connector 200, the plug connector 100 is received in the receiving cavity 80. The tongue plate 1 of the plug connector 100 is at least partially inserted into the mating slot 5201, so that the plurality of conductive pads 11 are in contact with the first elastic contact portions 611 and the second elastic contact portions 621, respectively. The first elastic mating portion 3121 of the first plug power terminal 31 and the second elastic mating portion 3221 of the second plug power terminal 32 contact the first plate-shaped contact portion 711 of the first receptacle power terminal 71 and the second plate-shaped contact portion 721 of the second receptacle power terminal 72, respectively, to realize the function of power supply. During the first plug power terminal 31 and the second plug power terminal 32 being in contact with the first receptacle power terminal 71 and the second receptacle power terminal 72, respectively, the first side end wall 521 of the mating protrusion 52 and the first plate-shaped contact portion 711 of the first receptacle power terminal 71 are inserted into the first gap g1, and the second side end wall 522 of the mating protrusion 52 and the second plate-shaped contact portion 721 of the second receptacle power terminal 72 are inserted into the second gap g2. The first relief groove 412 and the second relief groove 422 respectively provide a space for the first elastic mating portion 3121 and the second elastic mating portion 3221 to deform in a direction away from the receiving space 20.

Compared with the prior art, the present disclosure enables the plug connector 100, the receptacle connector 200 and the connector assembly 300 to have data transmission and power supply functions, and expands the applications of the plug connector 100, the receptacle connector 200, and the connector assembly 300 by adopting the plug power terminal 3 located on at least one side of the conductive pads 11 and the receptacle power terminal 7 located on at least one side of the mating slot 5201 along the transverse direction T-T.

In order for better understanding the specification and claims of the present disclosure, a general concept of component names beginning with "first", "second", "third", and "fourth" in the present disclosure is a component name after "first", "second", "third", and "fourth" are removed. For example, a general concept of the first plug power terminal 31 and the second plug power terminal 32 is the plug power terminal 3. A general concept of the first receptacle power terminal 71 and the second receptacle power terminal 72 is the receptacle power terminal 7, and so on.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A plug connector, comprising:

a tongue plate, the tongue plate extending along a longitudinal direction, at least one side of the tongue plate being provided with a plurality of conductive pads, the conductive pads located on a same side of the tongue plate being arranged at intervals along a transverse direction perpendicular to the longitudinal direction, and a metal shell, the metal shell being located on a periphery of the tongue plate, the metal shell comprising a first wall portion, a second wall portion opposite to the first wall portion, a first side wall connecting one side of the first wall portion and one side of the second wall portion, and a second side wall connecting another side of the first wall portion and another side of the second wall portion, the first wall portion, the second wall portion, the first side wall and the second side wall being jointly enclosed to form a receiving space to receive the tongue plate, the first wall portion defining an opening extending through the first wall portion in a direction away from the second wall portion, the opening being in communication with the receiving space, the conductive pads provided on the at least one side of the tongue plate being exposed in the opening;

wherein the plug connector further comprises at least one plug power terminal located on at least one side of the conductive pads in the transverse direction, the plug power terminal comprises an elastic mating portion protruding toward the tongue plate in the transverse direction, and the elastic mating portion protrudes into the receiving space; and wherein the plug connector further comprises an insulating mounting block fixed to the metal shell, the insulating mounting block comprises a relief groove corresponding to the elastic mating portion and provides a space for the elastic mating portion to deform in a direction away from the receiving space.

2. The plug connector according to claim 1, wherein the insulating mounting block is provided with a positioning post, the plug power terminal comprises a fixing portion and an extension arm extending from the fixing portion in the longitudinal direction, the fixing portion defines a positioning hole matched with the positioning post, the elastic mating portion is located at a free end of the extension arm in the longitudinal direction.

3. The plug connector according to claim 1, wherein the insulating mounting block comprises positioning slots located at opposite ends of the insulating mounting block in the longitudinal direction, and the metal shell comprises positioning tabs matched with the positioning slots.

4. The plug connector according to claim 2, further comprising a built-in circuit board on which the tongue plate is located, the plug power terminal comprising a mounting tail extending from the fixing portion, and the mounting tail being electrically connected to the built-in circuit board.

5. The plug connector according to claim 1, wherein the plug power terminal comprises a first plug power terminal and a second plug power terminal which are located on opposite sides of the conductive pads along the transverse direction; the elastic mating portion comprises a first elastic mating portion provided on the first plug power terminal and a second elastic mating portion provided on the second plug power terminal, the first elastic mating portion protrudes toward the second elastic mating portion along the transverse direction and protrudes into the receiving space, and the second elastic mating portion protrudes toward the first elastic mating portion along the transverse direction and protrudes into the receiving space.

6. The plug connector according to claim 5, wherein the first plug power terminal and the second plug power terminal are symmetrically arranged on opposite sides of the tongue plate, a first gap is formed between the first elastic mating portion and the tongue plate along the transverse direction, and a second gap is formed between the second elastic mating portion and the tongue plate along the transverse direction.

7. The plug connector according to claim 5, further comprising a first insulating mounting block fixed to the first side wall and a second insulating mounting block fixed to the second side wall; the first insulating mounting block defining a first relief groove corresponding to the first elastic mating portion and providing a space for the first elastic mating portion to deform in a direction away from the receiving space; and the second insulating mounting block defining a second relief groove corresponding to the second elastic mating portion and providing a space for the second elastic mating portion to deform in a direction away from the receiving space.

8. The plug connector according to claim 1, further comprising a grounding spring fixed to the metal shell, the grounding spring corresponding to and protruding outwardly beyond the first wall portion, the second wall portion, the first side wall, and the second side wall, respectively.

9. A receptacle connector, comprising:

an insulating body, the insulating body comprising a base and a mating protrusion extending from the base, the mating protrusion comprising a mating surface and a mating slot extending through the mating surface; and a plurality of conductive terminals, the plurality of conductive terminals comprising a first row of conductive terminals and a second row of conductive terminals, the first row of each conductive terminal comprising a first elastic contact portion extending into the mating slot, the second row of each conductive terminal comprising a second elastic contact portion extending into the mating slot, the first elastic contact portions and the second elastic contact portions being located on opposite sides of the mating slot, respectively;

wherein the receptacle connector further comprises at least one receptacle power terminal, the receptacle power terminal comprises a plate-shaped contact portion located on at least one side of the mating slot in a width direction of the mating protrusion, and the plate-shaped contact portion is located outside the mating protrusion.

10. The receptacle connector according to claim 9, wherein the mating protrusion comprises a groove located on an outer side of the mating protrusion, and the plate-shaped contact portion is received in the groove.

11. The receptacle connector according to claim 9, wherein the mating protrusion comprises a convex post extending outwardly, and the plate-shaped contact portion comprises a through hole matched with the convex post.

12. The receptacle connector according to claim 9, wherein at least one side of the base is provided with a receiving groove recessed inwardly, the receptacle power terminal comprises a main body portion received in the receiving groove, and the plate-shaped contact portion and the main body portion are located in different vertical planes; and wherein in the width direction of the mating protrusion, the main body portion is farther away from the mating slot than the plate-shaped contact portion.

13. The receptacle connector according to claim 12, wherein the receiving groove comprises a first extension groove and a second extension groove which extend in opposite directions, the main body portion of the receptacle power terminal comprises a first extension protrusion positioned in the first extension groove and a second extension protrusion positioned in the second extension groove.

14. The receptacle connector according to claim 12, wherein the receptacle power terminal comprises a bent portion connecting the plate-shaped contact portion and the main body portion, and the base defines a slot to accommodate the bent portion.

15. The receptacle connector according to claim 12, wherein the receptacle power terminal comprises a fork-shaped mounting portion extending from the main body portion, the fork-shaped mounting portion comprises a first mounting leg, a second mounting leg, and a gap formed between the first mounting leg and the second mounting leg, an end of the first mounting leg is inclined toward the second mounting leg, and an end of the second mounting leg is inclined toward the first mounting leg.

16. The receptacle connector according to claim 9, wherein the receptacle power terminal comprises a first receptacle power terminal and a second receptacle power terminal, the plate-shaped contact portion comprises a first plate-shaped contact portion provided on the first receptacle power terminal and a second plate-shaped contact portion provided on the second receptacle power terminal, the first plate-shaped contact portion and the second plate-shaped contact portion are located on opposite sides of the mating slot in the width direction of the mating protrusion, and the first plate-shaped contact portion and the second plate-shaped contact portion are located outside the mating protrusion.

17. The receptacle connector according to claim 16, wherein the first receptacle power terminal and the second receptacle power terminal are symmetrically arranged on opposite sides of the mating slot.

18. The receptacle connector according to claim 9, further comprising a metal shielding shell located on a periphery of the insulating body, the metal shielding shell defining a receiving cavity located at a front end of the mating protrusion and communicating with the mating slot.

19. A connector assembly, comprising:

a plug connector, comprising:

a tongue plate, the tongue plate extending along a longitudinal direction, at least one side of the tongue plate being provided with a plurality of conductive pads, the conductive pads located on a same side of the tongue plate being arranged at intervals along a transverse direction perpendicular to the longitudinal direction; and a metal shell, the metal shell being located on a periphery of the tongue plate, the metal shell comprising a first wall portion, a second wall portion opposite to the first wall portion, a first side wall connecting one side of the first wall portion and one side of the second wall portion, and a second side wall connecting another side of the first wall portion and another side of the second wall portion, the first wall portion, the second wall portion, the first side wall and the second side wall being jointly enclosed to form a receiving space to receive the tongue plate, the first wall portion defining an opening extending through the first wall portion in a direction away from the second wall portion, the opening being in communication with the receiving space, the conductive pads provided on the at least one side of the tongue plate being exposed in the opening;

wherein the plug connector further comprises at least one plug power terminal located on at least one side of the conductive pads in the transverse direction, the plug power terminal comprises an elastic mating portion protruding toward the tongue plate in the transverse direction, and the elastic mating portion protrudes into the receiving space; and a receptacle connector, comprising:

an insulating body, the insulating body comprising a base and a mating protrusion extending from the base, the mating protrusion comprising a mating surface and a mating slot extending through the mating surface; and a plurality of conductive terminals, the plurality of conductive terminals comprising a first row of conductive terminals and a second row of conductive terminals, the first row of each conductive terminal comprising a first elastic contact portion extending into the mating slot, the second row of each conductive terminal comprising a second elastic contact portion extending into the mating slot, the first elastic contact portions and the second elastic contact portions being located on opposite sides of the mating slot, respectively;

wherein the receptacle connector further comprises at least one receptacle power terminal, the receptacle power terminal comprises a plate-shaped contact portion located on at least one side of the mating slot in a width direction of the mating protrusion, and the plate-shaped contact portion is located outside the mating protrusion;

wherein the tongue plate is at least partially inserted into the mating slot, so that the plurality of conductive pads are in contact with the first elastic contact portions and the second elastic contact portions, and the elastic mating portion of the plug power terminal is in contact with the plate-shaped contact portion of the receptacle power terminal.

* * * * *